United States Patent
Ashworth et al.

(10) Patent No.: US 10,374,698 B2
(45) Date of Patent: Aug. 6, 2019

(54) REDUCING OSCILLATION IN A SIGNAL BOOSTER

(71) Applicant: WILSON ELECTRONICS, LLC, St. George, UT (US)

(72) Inventors: Christopher Ken Ashworth, St. George, UT (US); Miklos Zoltan, Santa Clara, CA (US); Patrick Lee Cook, Cedar City, UT (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

(21) Appl. No.: 15/885,631

(22) Filed: Jan. 31, 2018

(65) Prior Publication Data
US 2018/0219615 A1 Aug. 2, 2018

Related U.S. Application Data (60) Provisional application No. 62/452,907, filed on Jan. 31, 2017.

(51) Int. Cl.
*H04B 7/26* (2006.01)
*H04B 7/155* (2006.01)

(52) U.S. Cl.
CPC ....... *H04B 7/2606* (2013.01); *H04B 7/15535* (2013.01)

(58) Field of Classification Search
CPC .............. H04B 7/2606; H04B 7/15535; H04B 7/15542; H04B 7/15564; H04B 17/403; H04B 17/40
See application file for complete search history.

(56) References Cited

U.S. PATENT DOCUMENTS

| | | | |
|---|---|---|---|
| 4,776,032 A | 10/1988 | Odate et al. | |
| 5,095,528 A * | 3/1992 | Leslie | H04B 7/15535 455/10 |
| 5,303,395 A | 4/1994 | Dayani | |
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |

(Continued)

FOREIGN PATENT DOCUMENTS

EP   1525678 B1   7/2008

OTHER PUBLICATIONS

FCC.; "Signal Booster Rules." http://www.federalregister.gov/documents/2013/04/11/2013-07396/signal-booster-rules; Rules and Regulations; Federal Register; Apr. 11, 2013; Document No. 2013-07396; pp. 21555-21565.

(Continued)

*Primary Examiner* — Dominic E Rego
(74) *Attorney, Agent, or Firm* — Thorpe North & Western (57) ABSTRACT

Technology for a repeater is disclosed. The repeater can include one or more amplification and filtering signal paths. The repeater can include a controller. The controller can detect an oscillation in the repeater. The controller can reduce a gain in the repeater by a first amount to cease the oscillation in the repeater. The controller can reduce the gain in the repeater further by a second amount to create an oscillation margin. The controller can modify the gain in the repeater further by a third amount to create an offset to the oscillation margin.

22 Claims, 6 Drawing Sheets

(56) References Cited

U.S. PATENT DOCUMENTS

| | | | |
|---|---|---|---|
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,280,799 B1* | 10/2007 | Najafi | H04B 7/15578 343/727 |
| 7,409,186 B2 | 8/2008 | Buren et al. | |
| 7,974,573 B2 | 7/2011 | Dean | |
| 2002/0044594 A1 | 4/2002 | Bongfeldt | |
| 2003/0043027 A1* | 3/2003 | Carson | H04B 3/54 375/259 |
| 2003/0123401 A1 | 7/2003 | Dean | |
| 2004/0106382 A1* | 6/2004 | Fisher | H04B 7/15535 455/87 |
| 2004/0110469 A1* | 6/2004 | Judd | G01S 19/25 455/15 |
| 2004/0137854 A1 | 6/2004 | Ge | |
| 2004/0146013 A1 | 7/2004 | Song et al. | |
| 2004/0156094 A1* | 8/2004 | Kawahara | H01S 3/094003 359/333 |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1* | 4/2006 | O'Neill | H04B 7/15535 455/25 |
| 2006/0270354 A1* | 11/2006 | de La Chapelle | H01Q 1/28 455/66.1 |
| 2007/0071128 A1 | 3/2007 | Meir et al. | |
| 2007/0188235 A1 | 8/2007 | Dean | |
| 2007/0197207 A1* | 8/2007 | Carstens | H04W 88/085 455/423 |
| 2008/0081555 A1* | 4/2008 | Kong | H04B 7/15564 455/11.1 |
| 2008/0096483 A1 | 4/2008 | Van Buren et al. | |
| 2008/0132165 A1* | 6/2008 | Kho | H04B 7/15571 455/11.1 |
| 2008/0278237 A1 | 11/2008 | Blin | |
| 2010/0136966 A1 | 6/2010 | Pergal | |
| 2011/0143658 A1 | 6/2011 | Hanson et al. | |
| 2011/0151775 A1 | 6/2011 | Kang et al. | |
| 2011/0217943 A1 | 9/2011 | Ashworth et al. | |
| 2013/0053020 A1* | 2/2013 | Van Buren | H03G 3/3036 455/422.1 |
| 2013/0203403 A1* | 8/2013 | Cook | H04W 24/02 455/423 |
| 2013/0203404 A1* | 8/2013 | Cook | H04W 24/02 455/423 |
| 2014/0050253 A1* | 2/2014 | Jovanovic | H04L 27/26 375/211 |
| 2016/0135059 A1* | 5/2016 | Zhan | H04W 16/26 370/315 |

OTHER PUBLICATIONS

Microchip.; "28/40-Pin 8-Bit CMOS Flash Microcontrollers." PIC16F87X Data Sheet; 2001; www.Microchip.com; 219 Pages.

PCT Application No. PCT/2018/016300; Filing date Jan. 31, 2018 Christopher Ken Ashworth, International Search Report, dated May 10, 2018, 12 Pages.

3GPP2.; "Recommended minimum Performance Standards for cdma2000 Spread Spectrum Mobile Stations." Release B, Version 1; Dec. 13, 2002; 448 Pages.

* cited by examiner

REDUCING OSCILLATION IN A SIGNAL BOOSTER

RELATED APPLICATIONS

The present application claims the benefit of U.S. Provisional Patent Application No. 62/452,907, filed Jan. 31, 2017, the entire specification of which is hereby incorporated by reference in its entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Figure 1:
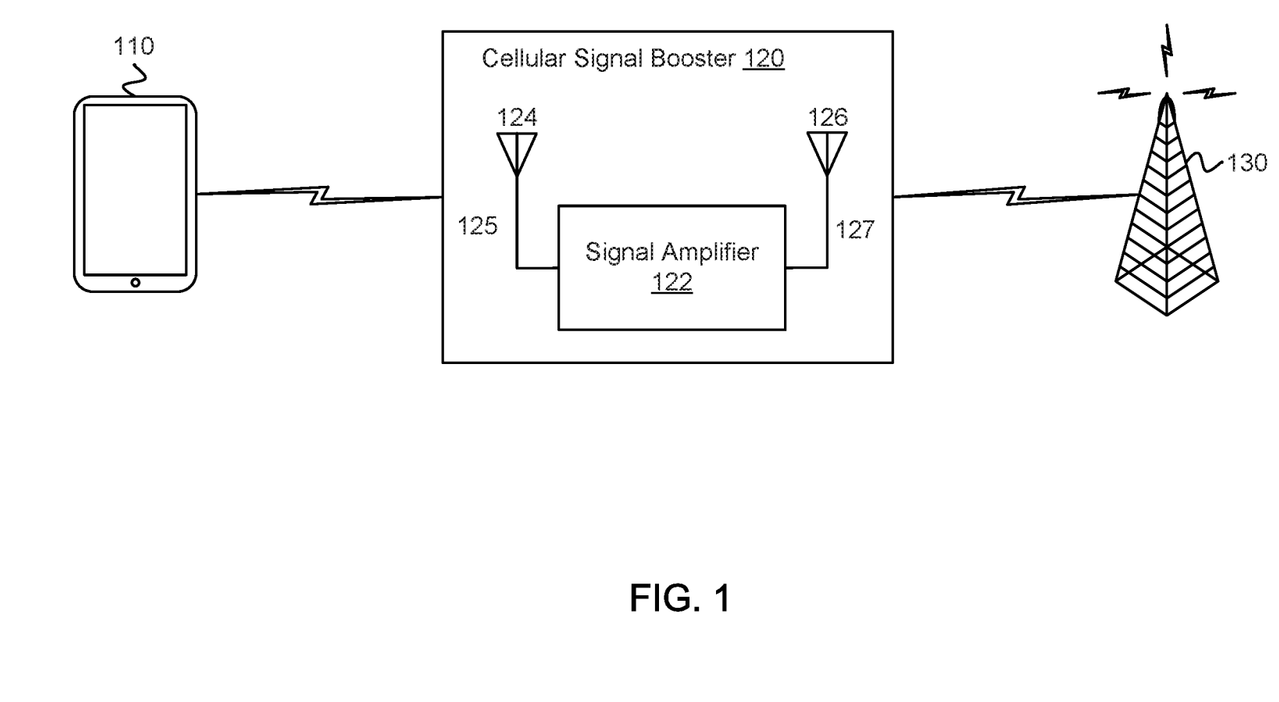
FIG. 1 illustrates a signal booster in communication with a wireless device and a base station in accordance with an example.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016-10).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 110 and transmit DL signals to the wireless device 110 using a single antenna. Alternatively, the integrated device antenna 124 can receive UL signals from the wireless device 110 using a dedicated UL antenna, and the integrated device antenna 124 can transmit DL signals to the wireless device 110 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

Figure 2:
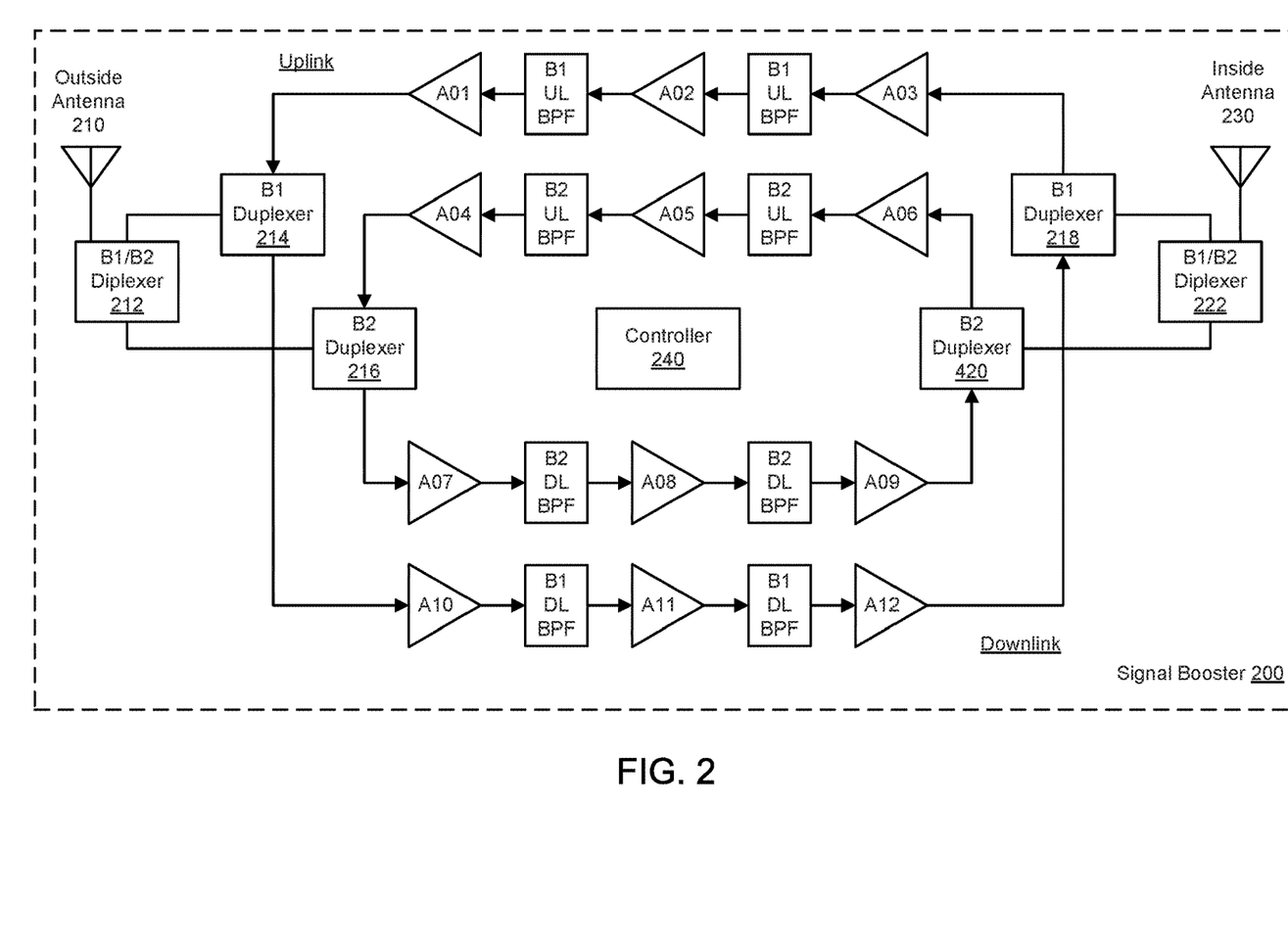
FIG. 2 illustrates a cellular signal booster configured to amplify uplink (UL) and downlink (DL) signals using one or more downlink signal paths and one or more uplink signal paths in accordance with an example.

FIG. 2 illustrates an exemplary bi-directional wireless signal booster 200 configured to amplify uplink (UL) and downlink (DL) signals using a separate signal path for each UL frequency band and DL frequency band and a controller 240. The bi-directional wireless signal booster 200 can be integrated with a GPS module in a signal booster. An outside antenna 210, or an integrated node antenna, can receive a downlink signal. For example, the downlink signal can be received from a base station (not shown). The downlink signal can be provided to a first B1/B2 diplexer 212, wherein B1 represents a first frequency band and B2 represents a second frequency band. The first B1/B2 diplexer 212 can create a B1 downlink signal path and a B2 downlink signal path. Therefore, a downlink signal that is associated with B1 can travel along the B1 downlink signal path to a first B1 duplexer 214, or a downlink signal that is associated with B2 can travel along the B2 downlink signal path to a first B2 duplexer 216. After passing the first B1 duplexer 214, the downlink signal can travel through a series of amplifiers (e.g., A10, A11 and A12) and downlink band pass filters (BPF) to a second B1 duplexer 218. Alternatively, after passing the first B2 duplexer 216, the downlink can travel through a series of amplifiers (e.g., A07, A08 and A09) and downlink band pass filters (BFF) to a second B2 duplexer 220. At this point, the downlink signal (B1 or B2) has been amplified and filtered in accordance with the type of amplifiers and BPFs included in the bi-directional wireless signal booster 200. The downlink signals from the second B1 duplexer 218 or the second B2 duplexer 220, respectively, can be provided to a second B1/B2 diplexer 222. The second B1/B2 diplexer 222 can provide an amplified downlink signal to an inside antenna 230, or an integrated device antenna. The inside antenna 230 can communicate the amplified downlink signal to a wireless device (not shown), such as a mobile phone.

In one example, the inside antenna 230 can receive an uplink (UL) signal from the wireless device. The uplink signal can be provided to the second B1/B2 diplexer 222. The second B1/B2 diplexer 222 can create a B1 uplink signal path and a B2 uplink signal path. Therefore, an uplink signal that is associated with B1 can travel along the B1 uplink signal path to the second B1 duplexer 218, or an uplink signal that is associated with B2 can travel along the B2 uplink signal path to the second B2 duplexer 222. After passing the second B1 duplexer 218, the uplink signal can travel through a series of amplifiers (e.g., A01, A02 and A03) and uplink band pass filters (BPF) to the first B1 duplexer 214. Alternatively, after passing the second B2 duplexer 220, the uplink signal can travel through a series of amplifiers (e.g., A04, A05 and A06) and uplink band pass filters (BPF) to the first B2 duplexer 216. At this point, the uplink signal (B1 or B2) has been amplified and filtered in accordance with the type of amplifiers and BFFs included in the bi-directional wireless signal booster 200. The uplink signals from the first B1 duplexer 214 or the first B2 duplexer 216, respectively, can be provided to the first B1/B2 diplexer 12. The first B1/B2 diplexer 212 can provide an amplified uplink signal to the outside antenna 210. The outside antenna can communicate the amplified uplink signal to the base station.

In one example, the bi-directional wireless signal booster 200 can be a 6-band booster. In other words, the bi-directional wireless signal booster 200 can perform amplification and filtering for downlink and uplink signals having a frequency in bands B1, B2, B3 B4, B5 and/or B6.

In one example, the bi-directional wireless signal booster 200 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

Figure 3:
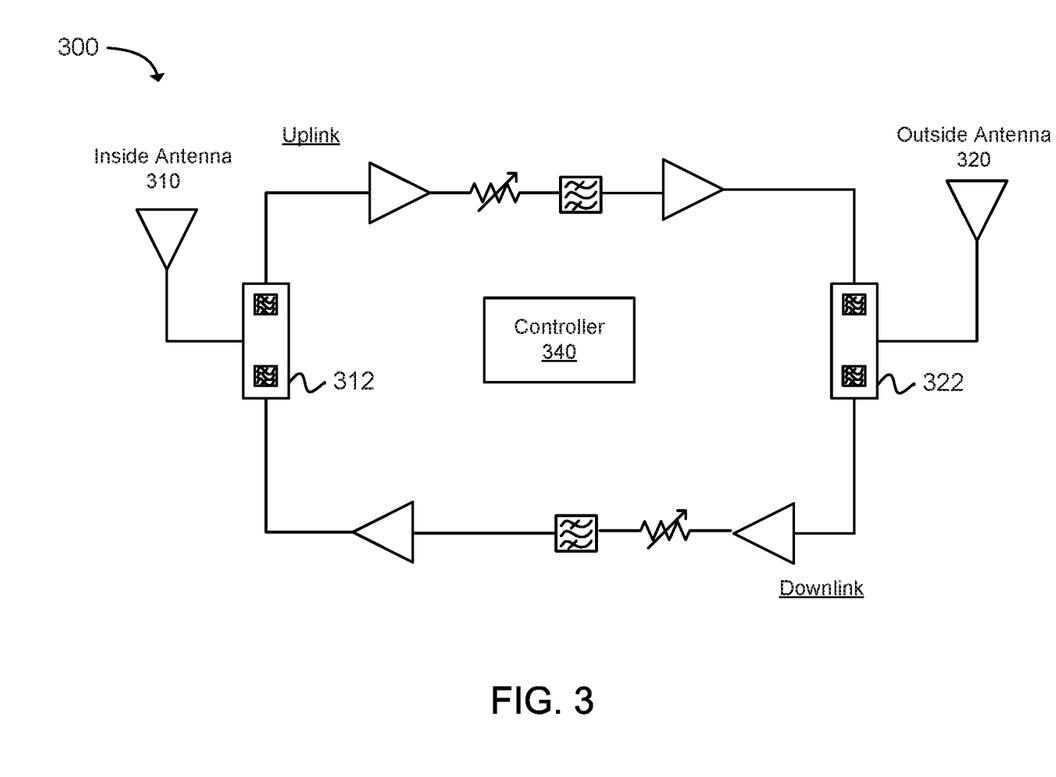
FIG. 3 illustrates a signal booster with a controller operable to reduce oscillation in the signal booster in accordance with an example.

FIG. 3 illustrates an example of a signal booster 300. The signal booster 300 can also be referred to as a repeater. The signal booster 300 can include a first antenna (or inside antenna 310) and a second antenna (or outside antenna 320). The signal booster 300 can include a first multi-band filter 312 and a second multi-band filter 322. The first multi-band filter 312 can be communicatively coupled between the first antenna (or inside antenna 310) and the second antenna (or outside antenna 320), and the second multi-band filter 322 can be communicatively coupled between the first antenna (or inside antenna 310) and the second antenna (or outside antenna 320). The first multi-band filter 312 and the second multi-band filter 322 can include splitters, duplexers, triplexers, quad-plexers, etc.

In one example, the signal booster 300 can include one or more amplification and filtering signal paths. For example, the signal booster 300 can include one or more uplink amplification and filtering signal paths, and the signal booster 300 can include one or more downlink amplification and filtering signal paths. Each amplification and filtering signal path (either uplink or downlink) can include one or more amplifiers and one or more filters to manipulate the signals.

In one configuration, the signal booster 300 can include a controller 340. The controller 340 can be configured to reduce oscillation in the signal booster 300. Generally speaking, the oscillation can be created when outside and inside antennas that are internally located in the signal booster 300 are within a defined distance from each other, such that a level of booster amplification is greater than a path loss between the antennas and a positive feedback loop exists. With signal boosters, two antennas that are within a defined distance from each other can produce an RF squeal.

From an installation perspective, a customer may install signal booster antennas relatively close to each other (e.g., due to constraints in a home), but a greater gain of the signal booster requires that the antennas be installed further away from each other. When antennas are installed relatively close to each other, the oscillation can occur in either a downlink path or an uplink path. In some cases, downlink and/or uplink signals can be analyzed to determine the presence of or confirm an oscillation created by an amplifier in the signal booster.

In one example, oscillations can be caused due to feedback or noise, which can be amplified in the signal booster 300 over a period of time. Since the signal booster 300 can include both an uplink path and a downlink path, there is a loop that has the potential to cause internal oscillations. For example, in a feedback path from one antenna to another antenna, one antenna can transmit to the other antenna. An oscillation can occur when a loss between antennas is less than a gain in the signal booster 300. An oscillation may not occur when a loss between the antennas is greater than a gain in the signal booster 300. In addition, an oscillation can occur when an output port of the signal booster 300 couples back to an input port of the signal booster due to poor shielding.

In one example, the signal booster 300 can include the first antenna (or inside antenna 310), the one or more amplifiers, the second antenna (or outside antenna 320), and cabling that connects the first antenna (or inside antenna 310), the one or more amplifiers, and the second antenna (or outside antenna 320). The second antenna (or outside antenna 320) can receive a signal outside a building and transmit the signal to the one or more amplifiers. The one or more amplifier can boost the signal and then send an amplified signal to the first antenna (or inside antenna 310). The first antenna (or inside antenna 310) can broadcast the amplified signal to an area with poor signal coverage. An oscillation can occur when a broadcasted signal from the first antenna (or inside antenna 310) is detected by the second antenna (or outside antenna 320), and the broadcasted signal is passed through the signal booster 300 again, which can result in a background noise. This noise can result in poor reception on the device being used. In some cases, the signal booster 300 can automatically reduce their capabilities or shut down when an oscillation or feedback begins to occur.

In one configuration, the controller 340 can detect an oscillation in the signal booster 300. The controller 340 can reduce a gain in the signal booster 300 by a first amount to cease the oscillation in the signal booster 300. In other words, the oscillation can be stopped by reducing the gain by the first amount in the signal booster 300 to an oscillation threshold level at which oscillation begins. This level can be a predetermined threshold level based on certain non-linearities that occur in oscillation. For example, when an input gain is increased by a predetermined amount, and the output gain is greater than the input. In another example, a noise floor level can increase by a non-linear amount relative to an input gain. The controller 340 can reduce the gain in the signal booster 300 further, below the oscillation threshold, by a second amount to create an oscillation margin. The oscillation margin can be a margin between an operating gain of the signal booster 300 and a gain at which oscillation begins (the oscillation threshold) in the signal booster 300. The oscillation margin can ensure that a noise floor does not rise above a level allowed by the set oscillation margin. The controller 340 can modify (e.g., reduce) the gain in the signal booster 300 further by a third amount to create an offset to the oscillation margin. In other words, the offset can create an additional margin to the oscillation margin. In effect, the oscillation margin can be increased by the offset (based on the reduction of the gain in the signal booster 300 by the third amount). The first amount, the second amount and the third amount can be represented in decibels (dB). In addition, the offset to the oscillation margin can reduce a transmitted noise power from the signal booster 300. The transmitted noise power can increase as the signal booster 300 gets closer to oscillation, so the offset to the oscillation margin can function to reduce the transmitted noise power.

In one example, the controller 340 can periodically increase the gain in the signal booster 300. The offset to the oscillation margin can reduce a likelihood that the increase to the gain causes a subsequent oscillation at the signal booster 300. In addition, the gain can be periodically increased to confirm an existence of the oscillation margin. In other words, the gain can be periodically increased to confirm an expected oscillation margin. In one example, the controller 340 can increase the gain by the oscillation margin. In another example, the controller 340 can increase the gain by the offset to the oscillation margin. In yet another example, the controller 340 can increase the gain by the oscillation margin and the offset to the oscillation margin.

In one configuration, the controller 340 can create an offset to the oscillation margin, which can further minimize the noise floor impact of the signal booster 300. The creation of the offset to the oscillation margin can be implemented in firmware. The creation of the offset to the oscillation margin can be more accurate under stable antenna feedback conditions (e.g., when the antennas and environment are not moving). In one configuration, the controller 340 can determine and add an oscillation margin (e.g., a first margin relative to the oscillation threshold level). Then, the controller 340 can add an additional margin (e.g., a second margin relative to the first margin) on top of the oscillation margin (or first margin). The additional margin (e.g., the second margin) can also be referred to as the offset to the oscillation margin or the additional margin to the oscillation margin (e.g., the first margin).

In one example, the gain can be periodically increased to ensure that the signal booster 300 has a proper margin. The feedback path can be changed due to a variety of issues, such as time, temperature, objects moving around, a vehicle or the mobile device moving around, etc. The feedback path can be changed when antenna becomes bumped or moved. Therefore, to ensure that the oscillation margin (e.g., 5 dB) is still present (and is at an expected level), the signal booster can be periodically bumped up (i.e., the gain can be increased to remove the oscillation margin). In other words, the signal booster 300 can periodically remove the oscillation margin to ensure that the oscillation margin is still accurate, and this can be referred to as a 'bump-up', and the noise floor can increase during bump-up.

The amount of amplification applied by a signal booster can change due to a number of factors, including changes in the atmosphere, movement of objects around the antennas, movement of the antennas, movement of the wireless device, and so forth. The periodic bump-up (or increase of the gain in the signal booster) can function to remove the oscillation margin (e.g., the first margin) to ensure that the signal booster 300 is still operating within the oscillation margin (e.g., the first margin). By adding the second margin, it reduces the chances that the signal booster will be operating at or above the oscillation threshold level when the bump-up is applied. Accordingly, when the bump-up is applied, the noise floor increase can be reduced by adding the additional margin (e.g., the second margin) to the oscillation margin (e.g., the first margin) since non-linear increases in noise floor will be reduced by maintaining the second margin below the oscillation threshold level.

In another example, the controller 340 can confirm that the additional margin (e.g., the second margin) is still accurate with a less frequent bump-up that removes both the oscillation margin (e.g., the first margin) and the additional margin (e.g., the second margin). By operating the signal booster near, at, or above the oscillation threshold level less frequently, the amplifiers operating in the signal booster can have a longer operating life. In addition, power use can be reduced and interference with a base station can be reduced.

In one configuration, the signal booster 300 can be turned on and an oscillation can be detected. The signal booster 300 can add noise to the network. The noise (or noise floor) can increase as a donor and server booster antennas become closer together. Upon detection of the oscillation, a gain in the signal booster 300 can be reduced until the signal booster 300 stops oscillating at the oscillation threshold level. Then, the controller 340 can drop the gain below the oscillation threshold level by the oscillation margin (e.g., 5 dB). In this example, after dropping the gain by the oscillation margin, there is 5 dB of margin before the signal booster 300 is operating at or above the oscillation threshold level. After determining an oscillation point, the controller 340 can drop the gain by the oscillation margin (e.g., 5 dB). In previous solutions, the signal booster 300 can periodically increase the gain (e.g., every 10 minutes) to confirm an expected oscillation margin. When this occurs, the signal booster 300 can increase the gain by the oscillation margin (e.g., 5 dB). Therefore, in previous solutions, after the increase to the gain, the signal booster 300 can be back to operating at the edge of oscillation again. However, this can result in non-linear increases in the noise floor (i.e. more than 5 dB).

Therefore, in the present solution, after the gain is dropped by the oscillation margin (e.g., 5 dB), the signal booster 300 can drop the again by an offset to the oscillation margin (e.g., 1 dB, 2 dB, or 3 dB). In other words, the signal booster 300 can further reduce the gain by an additional margin to the oscillation margin (e.g., 2 dB). In this case, when the signal booster periodically increases the gain by the oscillation margin (e.g., 5 dB), even with the increase to the gain, the signal booster 300 can be the offset to the oscillation margin (e.g., 2 dB) away from the oscillation threshold level. Due to the offset to the oscillation margin or the additional margin to the oscillation margin (e.g., 2 dB), the signal booster 300 is not back to the edge of oscillation after increasing the gain by the oscillation margin (e.g., 5 dB). Rather, the signal booster 300 still has a 2 dB margin from the point of oscillation. This can allow the booster to periodically test that it is operating within the oscillation margin level, while reducing the chances of periodically operating within the oscillation region and increasing the noise floor by more than the oscillation margin level (e.g. 5 dB).

In the above non-limiting example, the oscillation margin is 5 dB and the offset to the oscillation margin (or additional margin to the oscillation margin) is 2 dB. However, these values are not intended to be limiting. Therefore, the oscillation margin can be 5 dB, 10 dB, 15 dB, etc., and the offset to the oscillation margin (or additional margin to the oscillation margin) can be 1 dB, 2 dB, 5 dB, etc.

In one example, the signal booster 300 can be operating on the oscillation margin (e.g., 5 dB). After the signal booster 300 bumps up (i.e., increases the gain to remove the oscillation margin), the signal booster 300 can be on the edge of oscillating (but not actually oscillating). The bump-up can be advantageous because getting closer to oscillation causes feedback to start in the signal booster 300. In the signal booster 300, as the two antennas get closer to each other and start to feedback, the noise floor increases until the signal booster 300 is subject to the oscillation. The oscillation bump-up is performed by the controller 340 to determine that the threshold still exists, which is used to prevent the signal booster 300 from oscillating, which provides a margin from having the noise floor increase. The signal booster 300 can periodically increase the gain, and as a result, the network can periodically be hit with a noise floor bump.

In one example, the signal booster 300 can be turned on and an oscillation can be detected. The controller 340 can reduce the gain to a point that there is no oscillation (i.e. the oscillation threshold level). In other words, the controller 340 can reduce the gain until the oscillation substantially stops. Then, the controller 340 can further reduce the gain by a predetermined amount (e.g., 5 dB), which provides the oscillation margin. As a result, in this example, the operating level of the signal booster 300 is 5 dB below where the oscillation no longer exists. After a defined period of time (e.g., 10 minutes), the controller 340 can increase the gain to 5 dB above the operating level (i.e., the controller 340 increases the gain by 5 dB), which results in the controller 340 effectively removing the oscillation margin. This can be referred to as the bump-up level. The controller 340 can bump-up, thereby resulting in the signal booster 300 operating at the bump-up level. Then, the controller 340 can detect whether there is an oscillation in the signal booster 300. If there is an oscillation, then the controller 340 can reduce the gain again (e.g., the controller 340 can reduce the gain by 2 dB to cause the oscillation to stop and set a new oscillation threshold level). After the oscillation is removed, the controller 340 can reduce the gain again (e.g., by 5 dB) below the new oscillation threshold level, and this can be the new operating level. In this example, the new operating level is 2 dB lower than the previous operating level. After the defined period of time (e.g., 10 minutes), the controller can increase the gain by 5 dB (i.e., the controller 340 bumps up again), and if there is an oscillation, the controller 340 can reduce the gain again to a new oscillation threshold level, thereby causing the signal booster 300 to drop down to a new operating level. If the signal booster 300 bumps up and there is no oscillation, then the signal booster 300 can drop back down to the same operating level as before. As an example, if the controller 340 determines that there is no oscillation after increasing the gain by 5 dB, then the controller 340 can drop the gain down by 5 dB, and the controller 340 can know that the oscillation margin is at least 5 dB below the oscillation threshold level.

In one example, oscillation detection can involve applying the bump-up as a first action after an oscillation is confirmed. After the oscillation is confirmed, bump-up may not be applied. Instead, the controller 340 can immediately begin a mitigation process. When a mitigation cycle is complete and a suitable gain reduction is determined which stops the oscillation and results in a new oscillation threshold level, then a bump-up's worth of attenuation (the oscillation margin) plus the offset to the oscillation margin can be applied as additional attenuation below the new oscillation threshold level.

In one configuration, the controller 340 can be configured to reduce oscillation in the signal booster 300. The controller 340 can determine an oscillation threshold level at which oscillation is substantially reduced or ceases to occur at the signal booster 300. The controller 340 can select an oscillation margin level. The controller 340 can operate the signal booster 300 at an amplification level that is the oscillation margin level below the oscillation threshold level. The controller 340 can select an oscillation margin offset level that is less than the oscillation margin level. The oscillation margin level and the oscillation margin offset level can be presented in decibels (dB). The controller 340 can increase a gain of the signal booster 300 by the oscillation margin offset level to periodically determine if an oscillation occurs at the signal booster 300 while operating at the increased gain level. The oscillation margin offset level for the increased gain can reduce a noise floor impact of the signal booster 300. The controller 340 can decrease the gain of the signal booster 300 by the oscillation margin offset level to operate the signal booster 300 at the amplification level. In one example, the controller 340 can select the oscillation margin offset level to reduce a transmitted noise power from the signal booster 300.

In one example, the oscillation margin offset level can be the bump up level, and the oscillation margin offset level can be less than a margin amount. The oscillation margin offset level can refer to the offset to the oscillation margin level or the additional margin to the oscillation margin level. This can allow the signal booster 300 to operate at an increased gain, while still having the oscillation margin offset level to minimize the noise floor impact of the signal booster 300. As an example, rather than having an oscillation margin level of 5 dB and an oscillation margin offset level of 2 dB, there can be an oscillation margin level of 5 dB and a bump up of 3 dB, thereby resulting in the signal booster 300 still operating with an increased 2 dB gain. When bump up is applied, the signal booster can operate at a level that is 2 dB below the oscillation threshold level, thereby reducing the chances of non-linear gains in noise floor, as previously discussed.

Figure 4:
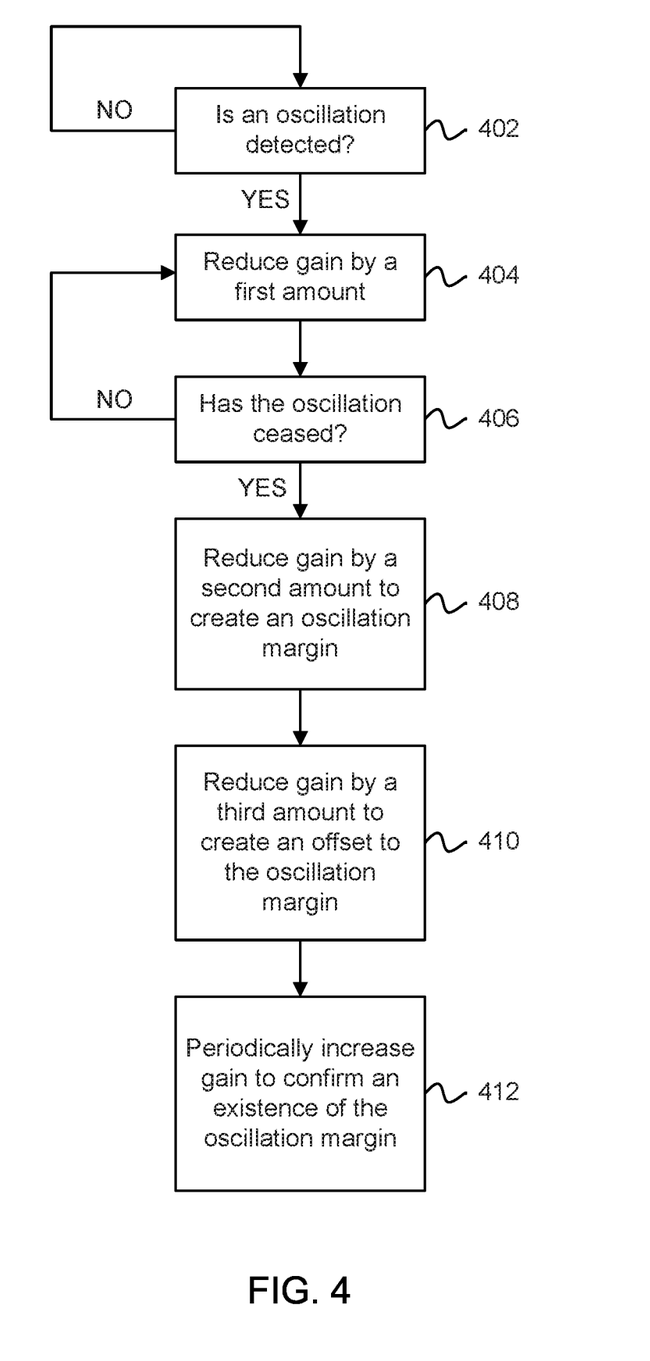
FIG. 4 illustrates a technique for reducing oscillation in a signal booster in accordance with an example.

FIG. 4 illustrates an exemplary technique for reducing oscillation in a signal booster. The technique can be implemented using a controller in the signal booster. In operation 402, the controller can determine whether an oscillation is detected. If an oscillation is not detected, then the controller can continue to check for oscillations that occur in the signal booster. If an oscillation is detected, then the controller can reduce a gain by a first amount, as in operation 404. In operation 406, the controller can determine whether the oscillation has ceased or stopped. If the oscillation has not ceased or stopped, then the controller can continue to reduce the gain until the oscillation has ceased or stopped. In operation 408, the controller can further reduce the gain by a second amount to create an oscillation margin. In operation 410, the controller can further reduce the gain by a third amount to create an offset to the oscillation margin. The first amount, the second amount and the third amount can be represented in decibels (dB). In operation 412, the controller can periodically increase the gain to confirm an existence of the oscillation margin. In other words, the controller can periodically increase the gain to confirm an expected oscillation margin.

Figure 5:
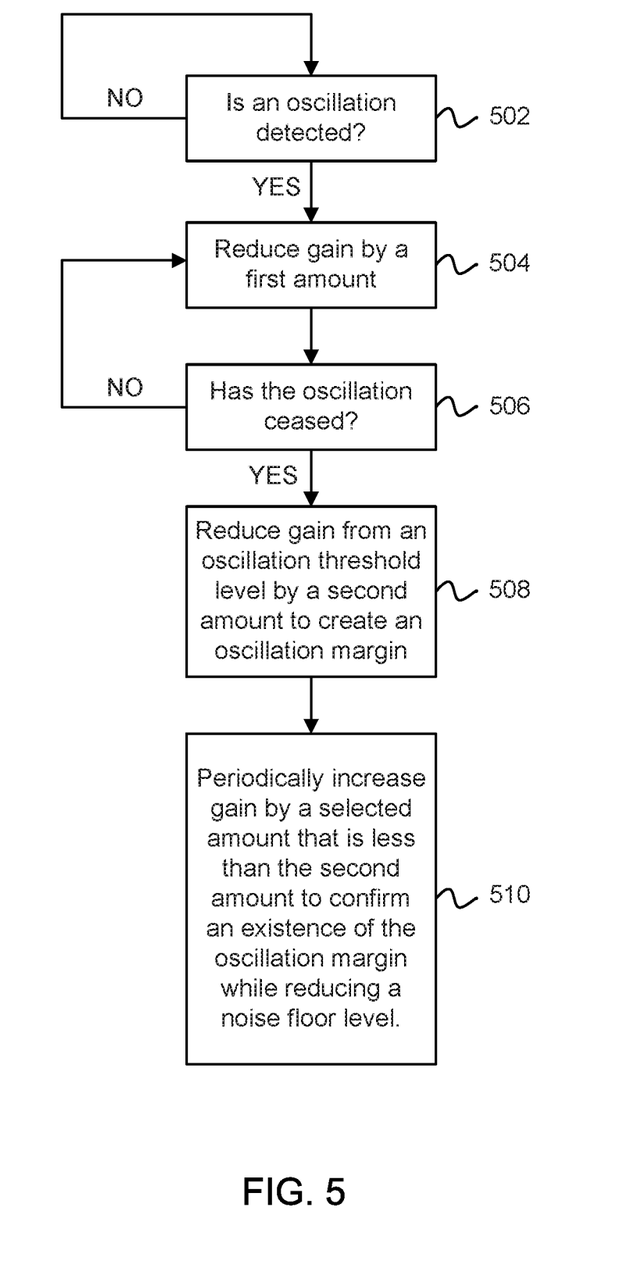
FIG. 5 illustrates a technique for reducing oscillation in a signal booster in accordance with an example.

FIG. 5 illustrates an exemplary technique for reducing oscillation in a signal booster. The technique can be implemented using a controller in the signal booster. In operation 502, the controller can determine whether an oscillation is detected. If an oscillation is not detected, then the controller can continue to check for oscillations that occur in the signal booster. If an oscillation is detected, then the controller can reduce a gain by a first amount, as in operation 504. In operation 506, the controller can determine whether the oscillation has substantially ceased or stopped. If the oscillation has not ceased or stopped, then the controller can continue to reduce the gain until the oscillation has ceased or stopped. The level at which the oscillation has substantially ceased or stopped is referred to as the oscillation threshold level. In operation 508, the controller can further reduce the gain from the oscillation threshold level by a second amount to create an oscillation margin. In operation 510, the controller can periodically increase the gain by a selected amount that is less than the second amount (the oscillation margin) to confirm an existence of the oscillation margin. When the controller increases the gain by the selected amount, it results in a capability to check the oscillation margin, while reducing a noise floor level of the signal booster relative to the signal booster operating at the oscillation threshold level. In addition, the technique illustrated in FIG. 5 can enable the signal booster to operate at a higher amplification level than when using the technique in FIG. 4, since there is no need to reduce the gain by the third amount.

Figure 6:
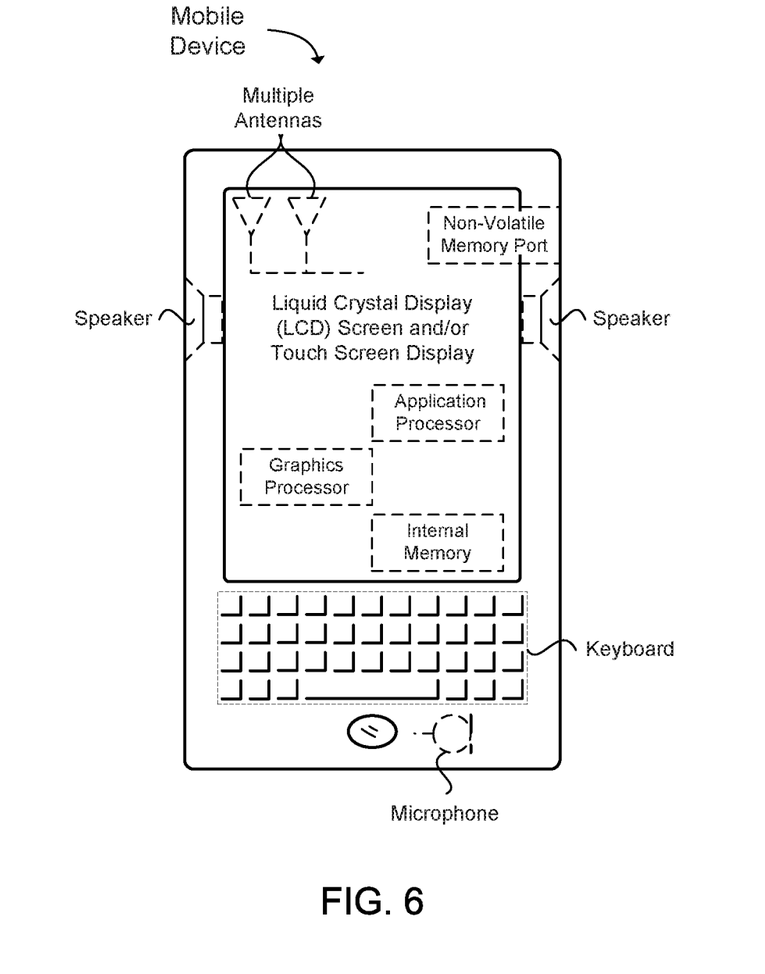
FIG. 6 illustrates a wireless device in accordance with an example.

FIG. 6 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 6 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a repeater, comprising: one or more amplification and filtering signal paths; and a controller configured to: detect an oscillation in the repeater; reduce a gain in the repeater by a first amount to cease the oscillation in the repeater; reduce the gain in the repeater further by a second amount to create an oscillation margin; and modify the gain in the repeater further by a third amount to create an offset to the oscillation margin.

Example 2 includes the repeater of Example 1, wherein the controller is further configured to periodically increase the gain in the repeater, wherein the offset to the oscillation margin reduces a likelihood that the increase to the gain causes a subsequent oscillation at the repeater.

Example 3 includes the repeater of any of Examples 1 to 2, wherein the controller is further configured to increase the gain by the oscillation margin.

Example 4 includes the repeater of any of Examples 1 to 3, wherein the controller is further configured to increase the gain by the offset to the oscillation margin.

Example 5 includes the repeater of any of Examples 1 to 4, wherein the controller is further configured to increase the gain by the oscillation margin and the offset to the oscillation margin.

Example 6 includes the repeater of any of Examples 1 to 5, wherein the controller configured to modify the gain is configured to reduce the gain in the repeater by the third amount to create the offset to the oscillation margin.

Example 7 includes the repeater of any of Examples 1 to 6, wherein the first amount, the second amount and the third amount are represented in decibels (dB).

Example 8 includes the repeater of any of Examples 1 to 7, wherein the one or more amplification and filtering signal paths include at least one of: one or more uplink amplification and filtering signal paths or one or more downlink amplification and filtering signal paths.

Example 9 includes the repeater of any of Examples 1 to 8, further comprising: a first antenna; and a second antenna.

Example 10 includes the repeater of any of Examples 1 to 9, further comprising: a first multi-band filter; and a second multi-band filter, wherein the first multi-band filter is communicatively coupled between the first antenna and the second antenna, and the second multi-band filter is communicatively coupled between the first antenna and the second antenna.

Example 11 includes the repeater of any of Examples 1 to 10, wherein the controller is further configured to perform network protection for the one or more amplification and filtering signal paths.

Example 12 includes a signal booster, comprising: one or more amplification and filtering signal paths; and a controller configured to: reduce a gain in the signal booster by a first amount to create an oscillation margin; and reduce the gain in the signal booster further by a second amount to create an additional margin to the oscillation margin.

Example 13 includes the signal booster of Example 12, wherein the controller is configured to create the oscillation margin in response to detecting an oscillation at the signal booster.

Example 14 includes the signal booster of any of Examples 12 to 13, wherein the controller is further configured to periodically increase the gain in the signal booster, wherein the additional margin to the oscillation margin reduces a likelihood that the increase to the gain causes an oscillation at the signal booster.

Example 15 includes the signal booster of any of Examples 12 to 14, wherein the controller is further configured to increase the gain by the oscillation margin.

Example 16 includes the signal booster of any of Examples 12 to 15, wherein the controller is further configured to increase the gain by the offset to the oscillation margin.

Example 17 includes the signal booster of any of Examples 12 to 16, wherein the controller is further configured to increase the gain by the oscillation margin and the offset to the oscillation margin.

Example 18 includes the signal booster of any of Examples 12 to 17, wherein the first amount and the second amount are represented in decibels (dB).

Example 19 includes at least one non-transitory machine readable storage medium having instructions embodied thereon for reducing oscillation in a signal booster, the instructions when executed by one or more processors perform the following: determining an oscillation amplification threshold level at which oscillation is substantially reduced or ceases to occur at the signal booster; selecting an oscillation margin level; operating the signal booster at an amplification level that is the oscillation margin level below the oscillation amplification threshold level; selecting an oscillation margin offset level that is less than the oscillation margin level; increasing a gain of the signal booster by the oscillation margin offset level to periodically determine if an oscillation occurs at the signal booster while operating at the increased gain level, wherein the oscillation margin offset level for the increased gain reduces a noise floor impact of the signal booster; and decreasing the gain of the signal booster by the oscillation margin offset level to operate the signal booster at the amplification level.

Example 20 includes the at one non-transitory machine readable storage medium of Example 19, further comprising instructions when executed perform the following: amplifying and filtering signals in at least one of an uplink or a downlink.

Example 21 includes the at one non-transitory machine readable storage medium of any of Examples 19 to 20, further comprising instructions when executed perform the following: selecting the oscillation margin offset level to reduce a transmitted noise power from the signal booster.

Example 22 includes the at one non-transitory machine readable storage medium of any of Examples 19 to 21, wherein the oscillation margin offset level and the oscillation margin level are represented in decibels (dB).

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater, comprising:
one or more amplification and filtering signal paths; and
a controller configured to:
  detect an oscillation in the repeater;
  reduce a gain in the repeater by a first amount to cease the oscillation in the repeater;
  reduce the gain in the repeater further by a second amount to create an oscillation margin level;
  modify the gain in the repeater further by a third amount to create an offset to the oscillation margin level, wherein the offset to the oscillation margin level is an oscillation margin offset level that is less than the oscillation margin level; and
  increase a gain of the repeater by the oscillation margin offset level to verify an accuracy of the oscillation margin level, wherein the oscillation margin offset level reduces a noise floor impact of the repeater when the gain is increased to verify the accuracy of the oscillation margin level.

2. The repeater of claim 1, wherein the controller is further configured to periodically increase the gain in the repeater by the offset to the oscillation margin level, wherein the offset to the oscillation margin level reduces a likelihood that the increase to the gain causes a subsequent oscillation at the repeater.

3. The repeater of claim 1, wherein the controller is further configured to increase the gain by the oscillation margin level.

4. The repeater of claim 1, wherein the controller is further configured to increase the gain by the offset to the oscillation margin level.

5. The repeater of claim 1, wherein the controller is further configured to increase the gain by the oscillation margin level and the offset to the oscillation margin level.

6. The repeater of claim 1, wherein the controller configured to modify the gain is configured to reduce the gain in the repeater by the third amount to create the offset to the oscillation margin level.

7. The repeater of claim 1, wherein the first amount, the second amount and the third amount are represented in decibels (dB).

8. The repeater of claim 1, wherein the one or more amplification and filtering signal paths include at least one of: one or more uplink amplification and filtering signal paths or one or more downlink amplification and filtering signal paths.

9. The repeater of claim 1, further comprising:
a first antenna; and
a second antenna.

10. The repeater of claim 9, further comprising:
a first multi-band filter; and
a second multi-band filter,
wherein the first multi-band filter is communicatively coupled between the first antenna and the second antenna, and the second multi-band filter is communicatively coupled between the first antenna and the second antenna.

11. The repeater of claim 1, wherein the controller is further configured to perform network protection for the one or more amplification and filtering signal paths.

12. A signal booster, comprising:
one or more amplification and filtering signal paths; and
a controller configured to:
  reduce a gain in the signal booster by a first amount to create an oscillation margin level;
  reduce the gain in the signal booster further by a second amount to create an additional margin to the oscillation margin level, wherein the additional margin to the oscillation margin level is an oscillation margin offset level that is less than the oscillation margin level; and
  increase a gain of the signal booster by the oscillation margin offset level to verify an accuracy of the oscillation margin level, wherein the oscillation margin offset level reduces a transmitted noise power from the repeater when the gain is increased to verify the accuracy of the oscillation margin level.

13. The signal booster of claim 12, wherein the controller is configured to create the oscillation margin level in response to detecting an oscillation at the signal booster.

14. The signal booster of claim 12, wherein the controller is further configured to periodically increase the gain in the signal booster, wherein the additional margin to the oscillation margin level reduces a likelihood that the increase to the gain causes an oscillation at the signal booster.

15. The signal booster of claim 12, wherein the controller is further configured to increase the gain by the oscillation margin level.

16. The signal booster of claim 12, wherein the controller is further configured to increase the gain by the additional margin to the oscillation margin level.

17. The signal booster of claim 12, wherein the controller is further configured to increase the gain by the oscillation margin level and the additional margin to the oscillation margin level.

18. The signal booster of claim 12, wherein the first amount and the second amount are represented in decibels (dB).

19. At least one non-transitory machine readable storage medium having instructions embodied thereon for reducing oscillation in a signal booster, the instructions when executed by one or more processors perform the following:
determining an oscillation amplification threshold level at which oscillation is reduced or ceases to occur at the signal booster;
selecting an oscillation margin level;
operating the signal booster at an amplification level that is the oscillation margin level below the oscillation amplification threshold level;
selecting an oscillation margin offset level that is less than the oscillation margin level;
increasing a gain of the signal booster by the oscillation margin offset level to periodically determine if an oscillation occurs at the signal booster while operating at the increased gain level, wherein the oscillation margin offset level for the increased gain reduces a noise floor impact of the signal booster; and
decreasing the gain of the signal booster by the oscillation margin offset level to operate the signal booster at the amplification level.

20. The at one non-transitory machine readable storage medium of claim 19, further comprising instructions when executed perform the following: amplifying and filtering signals in at least one of an uplink or a downlink.

21. The at one non-transitory machine readable storage medium of claim 19, further comprising instructions when executed perform the following: selecting the oscillation margin offset level to reduce a transmitted noise power from the signal booster.

22. The at one non-transitory machine readable storage medium of claim 19, wherein the oscillation margin offset level and the oscillation margin level are represented in decibels (dB).

\* \* \* \* \*